(12) United States Patent
Nielsen et al.

(10) Patent No.: US 7,583,521 B2
(45) Date of Patent: Sep. 1, 2009

(54) OVER VOLTAGE CLAMP

(75) Inventors: Henning Roar Nielsen, Brenderup (DK); Jesper Winston Petersen, Kolding (DK)

(73) Assignee: American Power Conversion Corporation, West Kingston, RI (US)

(*) Notice: Subject to any disclaimer, the term of this patent is extended or adjusted under 35 U.S.C. 154(b) by 67 days.

(21) Appl. No.: 11/361,638

(22) Filed: Feb. 23, 2006

(65) Prior Publication Data

US 2007/0195566 A1 Aug. 23, 2007

(51) Int. Cl.
*H02H 7/125* (2006.01)

(52) U.S. Cl. .......................... 363/53; 323/205; 363/17; 363/56

(58) Field of Classification Search .................. 363/44, 363/84, 86, 125, 126, 53, 17, 40, 56, 56.02, 363/65, 132
See application file for complete search history.

(56) References Cited

U.S. PATENT DOCUMENTS

| | | | | |
|---|---|---|---|---|
| 4,471,423 A * | 9/1984 | Hase | | 363/90 |
| 4,903,186 A * | 2/1990 | Pullen, Jr. | | 363/45 |
| 4,949,234 A * | 8/1990 | Gulczynski | | 363/48 |
| 5,172,308 A * | 12/1992 | Tohya | | 363/16 |
| 5,351,179 A * | 9/1994 | Tsai et al. | | 363/53 |
| 5,412,308 A * | 5/1995 | Brown | | 323/267 |
| 5,541,828 A * | 7/1996 | Rozman | | 363/21.1 |
| 5,637,988 A * | 6/1997 | Gucyski | | 323/222 |
| 5,834,924 A * | 11/1998 | Konopka et al. | | 323/222 |
| 5,877,947 A * | 3/1999 | Chen et al. | | 363/53 |
| 5,909,108 A * | 6/1999 | He et al. | | 323/225 |
| 5,986,900 A * | 11/1999 | Clark | | 363/44 |
| 6,353,547 B1 * | 3/2002 | Jang et al. | | 363/132 |
| 6,628,532 B1 * | 9/2003 | Rinne et al. | | 363/21.06 |
| 6,853,564 B2 * | 2/2005 | Kravitz | | 363/44 |
| 6,944,036 B2 * | 9/2005 | Yan et al. | | 363/56.02 |
| 7,106,605 B2 * | 9/2006 | Chen et al. | | 363/52 |
| 2002/0044469 A1 * | 4/2002 | Yasumura | | 363/125 |
| 2002/0126518 A1 * | 9/2002 | Lazarovich | | 363/125 |
| 2002/0191425 A1 * | 12/2002 | Geissler | | 363/44 |
| 2003/0031037 A1 * | 2/2003 | Piaskowski | | 363/125 |
| 2003/0142513 A1 * | 7/2003 | Vinciarelli | | 363/17 |
| 2005/0024803 A1 * | 2/2005 | Ying et al. | | 361/82 |

OTHER PUBLICATIONS

2001 Future Energy Challenge, Texas A&M University, Fuel Cell Inverter—10 kW Design & Cost Analysis, Aug. 27, 2001.
Texas A&M University, 2001 Future Energy Design Team Final Report, Texas &M University, Fuel Cell Inverter, Faculty Advisors: Dr. Enjeti et al., Jun. 15, 2001.

* cited by examiner

*Primary Examiner*—Akm E Ullah
*Assistant Examiner*—M'Baye Diao
(74) *Attorney, Agent, or Firm*—Lando & Anastasi, LLP (57) ABSTRACT

A clamp circuit for use in a DC/DC voltage converter having a first converter output including a first node and a second node, and a second converter output including a third node a fourth node. The clamp circuit includes a positive voltage output node coupled to the first node, a negative voltage output node coupled to the fourth node, a neutral voltage output node, a first diode coupled between the positive voltage output node and the third node, a second diode coupled between the negative voltage output node and the second node, a first inductor coupled between the second diode and the neutral voltage output node, and a second inductor coupled between the first diode and the neutral voltage output node.

9 Claims, 7 Drawing Sheets

FIG. 7

OVER VOLTAGE CLAMP

BACKGROUND

DC/DC converters are fundamental parts of many electrical systems such as electric fuel cell systems and photo voltaic panel systems. A DC/DC converter is typically used to stabilize a DC voltage, to convert DC voltage from one level to another to supply a DC/AC inverter, and to provide galvanic isolation to an electrical circuit (e.g., isolating a load from a power source, or isolating an AC power grid from a power source (via a DC/AC converter)). The input connection to a DC/DC converter is typically a two-terminal source, whereas the output is typically a split or dual DC bus including a positive terminal, a negative terminal, and a center point. A three-terminal output is generally used to supply DC power to a three-level inverter.

DC/DC converters may have high-voltage spikes that appear across rectifier diodes contained within the converters. These voltage spikes can cause damage to the components within a DC/DC converter and are typically clamped by additional diodes that conduct and feed excess energy into a capacitor. The capacitor, in turn, is discharged after receiving energy, thereby allowing the capacitor to settle at a stable voltage. Typically, one of two methods is used to discharge the capacitor. First, a passive resistor is used to dissipate the energy stored in the capacitor. Second, in an active, powered, configuration, a small DC/DC converter may be used. These two options present a choice between advantages and disadvantages. Using a passive resistor to dissipate stored energy creates additional power losses, but is inexpensive. Using a second DC/DC converter decreases the power loss, but adds to the cost and complexity of the circuitry.

A DC/DC converter may also have a high amount of ripple current at the input side of the converter, which is typically undesirable. Additional DC filtering components are usually added to the DC/DC converter across the converter input to reduce ripple current.

SUMMARY

In general, in an aspect, the invention provides a clamp circuit for use in a DC/DC voltage converter having a first converter output including a first node and a second node, and a second converter output including a third node a fourth node. The clamp circuit includes a positive voltage output node coupled to the first node, a negative voltage output node coupled to the fourth node, a neutral voltage output node, a first diode coupled between the positive voltage output node and the third node, a second diode coupled between the negative voltage output node and the second node, a first inductor coupled between the second diode and the neutral voltage output node, and a second inductor coupled between the first diode and the neutral voltage output node.

Implementations of the invention can include one or more of the following features. An anode of the first diode is coupled to the second inductor, a cathode of the first diode is coupled to the positive voltage output node, an anode of the second diode is coupled to the negative output voltage node, and a cathode of the second diode is coupled to the first inductor. The clamp circuit further includes a first capacitor and a second capacitor, the first capacitor being coupled between the positive voltage output node and the neutral voltage output node, the second capacitor being coupled between the neutral voltage output node and the negative voltage output node. The clamp circuit further includes a third diode coupled between the first and second nodes, and a fourth diode coupled between the third and fourth nodes. The second diode is configured to conduct a current when a voltage across the third diode exceeds a predetermined threshold. The first diode is configured to conduct a current when a voltage across the fourth diode exceeds a predetermined threshold. The second diode is configured to conduct a current when a voltage across the fourth diode exceeds the predetermined threshold.

In general, in another aspect, the invention provides a system for receiving DC power of a first level and providing DC power of a second level, the system including first, second, and third outputs, the system including a transformer, a primary module configured to receive DC power of a first level and to provide a quasi-square wave to the transformer, a first rectifier bridge coupled to the transformer, and including first and second nodes, the first node being coupled to the first output, a second rectifier bridge coupled to the transformer, and including third and fourth nodes, the fourth node being coupled to the third output, and a voltage clamp arrangement coupled to the first and second rectifier bridges, the clamp arrangement including a first diode coupled between the first node and the third node, and a second diode coupled between the second node and the fourth node, wherein the first diode is configured to direct energy from the first rectifier bridge to the third output if the voltage across the first rectifier bridge exceeds a first threshold, and wherein the second diode is configured to direct energy from the second rectifier bridge to the first output if the voltage across the second rectifier bridge exceeds a second threshold.

Implementations of the invention can include one or more of the following features. The system further includes a first inductor coupled between the second node and the second output, and a second inductor coupled between the third node and the second output. The system further includes a first capacitor coupled between the first output and the second output, and a second capacitor coupled between the second output and the third output. The first diode includes an anode and a cathode, and the second diode includes an anode and a cathode, wherein the anode of the first diode is coupled to the third node, the cathode of the first diode is coupled to the first output, the anode of the second diode is coupled to the fourth node, and the cathode of the second diode is coupled to the second node. The system further includes a third diode coupled between the first and second nodes, and a fourth diode coupled between the third and fourth nodes.

In general, in another aspect, the invention provides a controller portion for use with a DC/DC voltage converter having first and second transformers, first and second switch transistor bridges being configured to provide quasi-square waves to the first and second transformer portions, a positive voltage output node, and a negative voltage output node, the controller including a first input node configured to be coupled to the positive voltage output node, a second input node configured to be coupled to the negative voltage output node, and a control circuit coupled to the first and second input nodes, configured to be coupled to the transistor bridges, and configured to provide output signals, in response to voltages applied to the first and second input nodes, for use by the transistor bridges, to produce quasi-square waves of desired duty cycles.

Implementations of the invention can include one or more of the following features. The control circuit is configured to control the duty cycles of the quasi-square waves provided to the transformer portions in response to a voltage difference between the first and second input nodes. The control circuit is configured to decrease the duty cycle of the quasi-square wave provided to the first transformer portion in response to the voltage applied to the first input node increasing relative to the voltage applied to the second input node. The control circuit is configured to increase the duty cycle of the quasi-square wave provided to the second transformer portion in response to the voltage applied to the second input node increasing relative to the voltage applied to the first input node. The control circuit includes first and second integrator circuits, first and second amplifiers, the first inverting amplifier being coupled to the first integrator circuit, the second inverting amplifier being coupled to the second integrator circuit, the second amplifier being an inverting amplifier, a first diode coupled between an output of the first inverting amplifier and a negative input of the second integrator circuit, and a second diode coupled between an output of the second inverting amplifier and a negative input of the first integrator circuit. The output of the first amplifier is coupled to the negative input node of the first integrator circuit, and the output of the second amplifier is coupled to the negative input node of the second integrator circuit. The first diode is coupled between the output of the first amplifier and the output of the second amplifier.

Various aspects of the invention may provide one or more of the following capabilities. Losses due to voltage clamping can be reduced compared to prior techniques. Efficiency of DC/DC voltage converters may be increased and cost decreased compared to previous DC/DC voltage converters. A balanced output voltage may be maintained during unbalanced loading of outputs of a DC/DC voltage converter. High voltage DC/DC conversion may be accomplished (e.g., ±400V). Pulse width modulation may be used to control the output voltage of a DC/DC voltage converter. Excess energy (e.g., voltage spikes) created in the DC/DC conversion process may be redirected to an output of the DC/DC converter.

These and other capabilities of the invention, along with the invention itself, will be more fully understood after a review of the following figures, detailed description, and claims.

DETAILED DESCRIPTION

Embodiments of the invention provide techniques for conversion of one DC voltage to another DC voltage. For example, a low voltage from a fuel cell (e.g., varying between about 30 and about 60V) may be converted to an output of about ±210V for use with an uninterruptible power supply used to maintain power to a load. An exemplary DC/DC converter includes a primary side that includes a DC/DC converter circuit, connected through a transformer to a secondary side. The secondary side includes multiple rectifier bridges and multiple DC voltage clamp circuits and is separated into a positive side and a negative side. The clamp circuits are configured such that a clamp diode from the positive side is coupled to the negative side, and vice-versa, e.g., to conduct excess current from one side to the other side to reduce, or possibly eliminate losses caused in the voltage clamping process. Furthermore, filter chokes (e.g., field inductors) connect the clamp circuits to an output center point. Other embodiments are within the scope of the invention.

Figure 1:
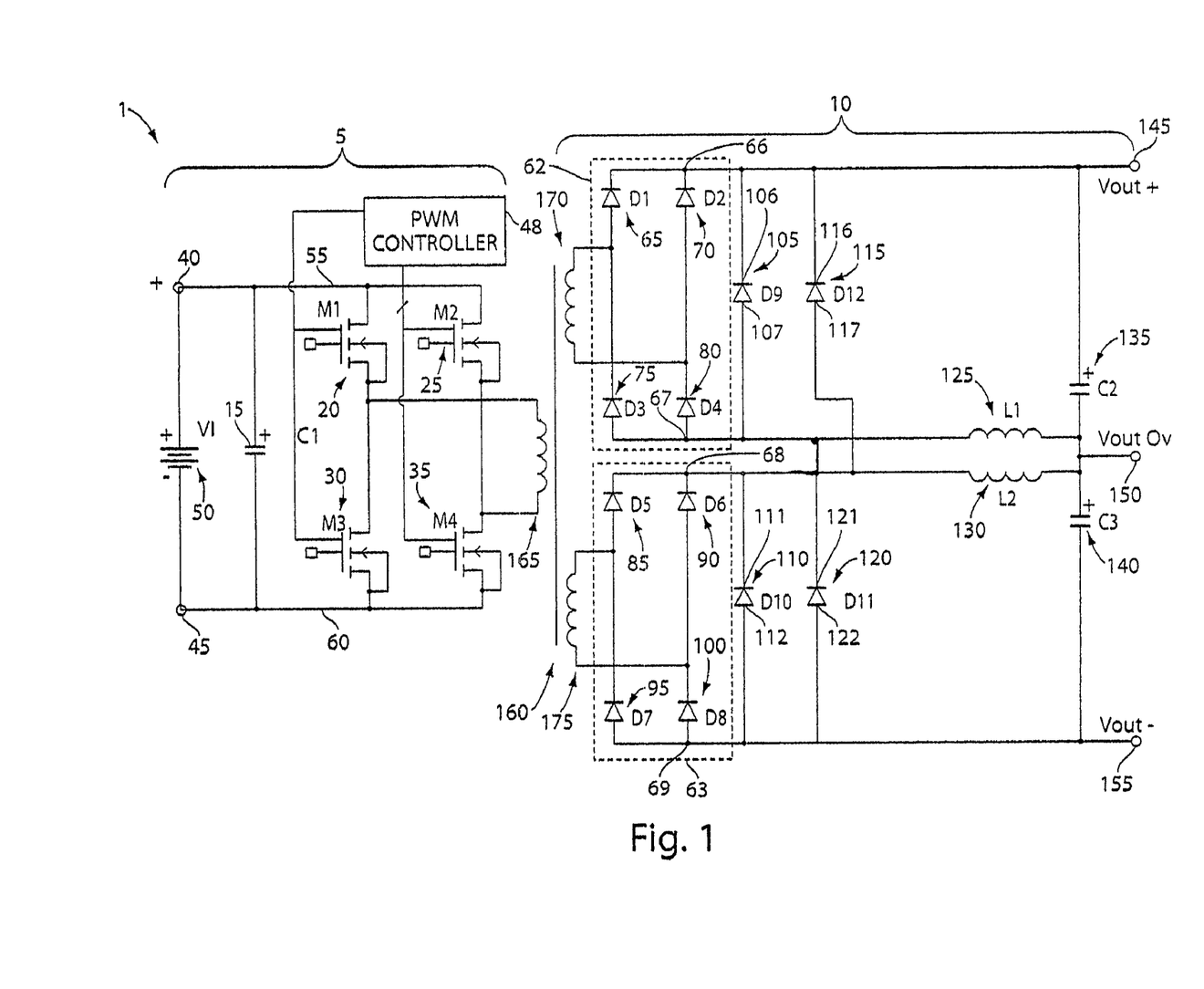
FIG. 1 is a circuit diagram of a DC/DC voltage converter with an over voltage clamp.

FIG. 1 shows an over voltage clamping DC/DC voltage converter 1 that includes a primary side 5 and a secondary side 10 coupled together by a transformer 160 having a primary winding 165 and secondary windings 170 and 175. The converter 1 includes a V+ input terminal 40, a V− input terminal 45, a Vout+ output 145, a Vout0V output 150, and a Vout− output 155. The converter 1 can convert a first DC input voltage received across the V+ input terminal 40 and the V− input terminal 45 to a second higher (or lower) DC voltage that is output to the Vout+ output 145 and/or the Vout− output 155. The primary side 5 is configured to convert the first DC voltage into a quasi-square wave, which is provided to the primary winding 165 of the transformer 160. The transformer 160 steps-up (or steps-down) the square wave pulses, which are converted into the second DC voltage by the secondary side 10.

The primary side 5 includes a capacitor 15, switch transistors 20, 25, 30, and 35, a positive voltage rail 55, a negative voltage rail 60, the V+ input terminal 40, the V− input terminal 45, and a pulse-width modulation (PWM) controller 48. The V+ input terminal 40 and the V− input terminal 45 are connected across an input power source 50 and connected to the positive voltage rail 55 and the negative voltage rail 60, respectively. The capacitor 15 is connected between the positive voltage rail 55 and the negative voltage rail 60. The capacitor 15 is typically about 40,000 µF, although other capacitances and/or configurations are possible (e.g., four 10,000 µF capacitors in parallel). The switch transistors 20, 25, 30, and 35 are connected between the positive voltage rail 55 and the negative voltage rail 60 in an H-bridge configuration. The primary winding 165 of the transformer 160 is coupled across the H-bridge between the junctions of the switch transistors 20 and 30 and the switch transistors 25 and 35. Each of the switch transistors 20, 25, 30, and 35 is configured such that its bulk terminal is connected to its source terminal. The switch transistors 20, 25, 30, and 35 are typically Metal Oxide Semiconductor Field Effect Transistors (MOSFETs), although other switch transistors may be used (e.g., Insulated Gate Bipolar Transistors (IGBTs) and Bipolar Junctions Transistors (BJTs)).

The PWM controller 48 is coupled to the gate of each of the switch transistors 20, 25, 30, and 35, to the Vout+ output 145, and the Vout− output 155. The PWM controller 48 actuates and deactuates pairs of the switch transistors 20, 25, 30, and 35 to regulate current flow to produce a pulse-width modulated quasi-square wave at the primary winding 165 of the transformer 160. For example, in a first state, the switch transistors 20 and 35 are actuated to conduct between a source and a drain and the switch transistors 25 and 30 are deactuated, inhibiting current flow from a source to a drain, thereby providing a positive voltage to the primary winding 165. In a second state, the switch transistors 20, 25, 30, and 35 are deactuated, thereby providing substantially no voltage to the primary winding 165. In a third state, the switch transistors 20 and 35 are deactuated and the switch transistors 25 and 30 are actuated, thereby providing a negative voltage to the primary winding 165.

Figure 2:
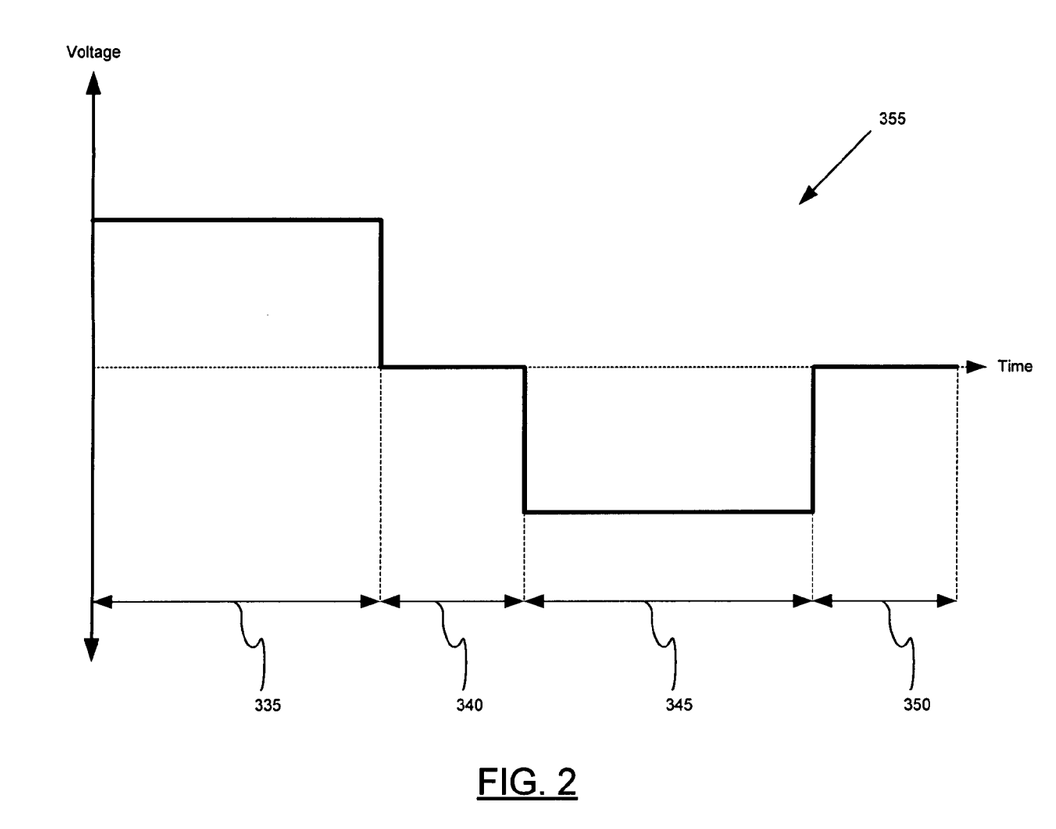
FIG. 2 is a graph representing a quasi-square wave provided by a transistor bridge in the DC/DC voltage converter of FIG. 1.

Referring also to FIG. 2, the PWM controller 48 preferably actuates and deactuates the transistors 20, 25, 30, and 35 to alternate between the first and third states and to effect the second state between each transition between the first to third state and the third to first state. As shown, the switch transistors 20, 25, 30, and 35 are in the first, second, third, and second states during times 335, 340, 345, and 350, respectively, resulting in a quasi-square wave 355 that is provided to the primary winding 165 of the transformer 160. Adjusting the duration of the first (or third) state relative to the summed duration of the first state and a single instance of the second state adjusts a duty cycle of the quasi-square wave provided to the primary winding 165. Preferably, to determine the duty cycle of the quasi square wave, the duration of the first state is divided by the summed duration of the first state and the single instance of the second state (e.g., implementing the first state for a 5 μs duration and the second state for a 5 μs duration yields a quasi-square wave with a 50% duty cycle). The PWM controller 48 is coupled to the Vout+ output 145 and the Vout− output 155 and is configured to adjust the duty cycle of the quasi-square wave based on the voltage supplied by the Vout+ output 145 and/or the Vout− output 155 (as described below). The second state duration 340 and 350 are preferably about relative to the durations 335 and 345, e.g., about 2.5 μS and 7.5 μS, respectively.

The primary side 5 is connected to the secondary side 10 via the transformer 160. The transformer 160 is a high-frequency transformer with a ferrite core, although other transformers may be used (e.g., a low-frequency transformer). The ratio of turns between the primary winding 165 and the secondary windings 170 and 175 is preferably the same for both of the windings 170 and 175 and is a function of the desired ratio of input voltage to output voltage of the transformer 160 as shown in the following equation:

$$\frac{v_2}{v_1} = \frac{N_2}{N_1}$$

where $v_1$ is a voltage across the primary winding 165 of the transformer 160, $v_2$ is the desired voltage across the secondary windings 170 and 175, $N_1$ is the total number of turns in the primary winding 165 of the transformer 160, and $N_2$ is the number of turns in each of the secondary windings 170 and 175 of the transformer 160. For example, if the primary winding 165 is supplied with 30V, and 210V is desired from the secondary winding 170, a turns ratio of 7:1 is used for the windings 170 and 175 compared to the winding 165. The first DC input voltage is stepped-up (or stepped-down) as a function of the winding ratio between first and second portions of the primary winding 165 and the secondary windings 170 and 175.

The secondary side 10 of the converter 1 includes diodes 65, 70, 75, 80, 85, 90, 95, 100, 105, 110, 115, and 120, inductors 125 and 130, capacitors 135 and 140, the Vout+ output 145, the Vout0V output 150, the Vout− output 155, and secondary windings 170 and 175. The diodes 65, 70, 75, and 80 are configured as a full-wave rectifier bridge 62 that will rectify the signal provided by the secondary winding 170 of the transformer 160. Connected across the rectifier bridge 62 is the diode 105. The diodes 85, 90, 95, and 100 are configured as a full-wave rectifier bridge 63 that will rectify the signal provided by the secondary winding 175 of the transformer 160. Connected across the rectifier bridge 63 is the diode 110. A cathode end 66 of the rectifier bridge 62 is coupled to the Vout+ output 145, and an anode end 67 of the rectifier bridge 62 is coupled to the Vout0V output 150 through the inductor 125. A cathode end 68 of the rectifier bridge 63 is coupled to the Vout0V output 150 through the inductor 130, and an anode end 69 of the rectifier bridge 63 is coupled to the Vout− output 155.

The diodes 115 and 120 are configured to clamp over voltage spikes across the diodes 105 and 110, respectively. A cathode 116 of the diode 115 is coupled to a cathode end 66 of the rectifier bridge 62 and to the Vout + output 145 and an anode 117 of the diode 115 is coupled to the cathode end 68 of the rectifier bridge 63 and to the inductor 130. An anode 122 of the diode 120 is coupled to the anode end 69 of the rectifier bridge 63 and to the Vout− output 155 and a cathode 121 of the diode 120 is coupled to the anode end 67 of the rectifier bridge 62 and to the inductor 125. The diodes 65, 70, 75, 80, 85, 90, 95, 100, 105, 110, 115, and 120 are DSEI30 diodes (manufactured by IXYS corporation, of Santa Clara, Calif.), although other diodes are possible. The inductors 125 and 130 are coupled to, respectively, the anode end 57 of the bridge 62 and the cathode end 68 of the bridge 63, and to the Vout0V output 150, and are configured to operate as filter chokes. The inductors 125 and 130 have inductances of about 400 μH, although other inductances may be used.

The secondary side 10 is configured to rectify and filter outputs of the secondary windings 170 and 175. The rectifier bridges 62 and 63 are coupled and configured to rectify outputs of the windings 170 and 175, respectively. For example, the rectifier bridges 62 and 63 produce positive voltage pulses corresponding to times when there is a non-zero voltage supplied to the primary winding 165 (e.g., when the switch transistors 20, 25, 30, and 35 are in the first state or third state). The secondary side 10 is configured such that each time the rectifier bridge 62 causes a voltage pulse across the diode 105 (e.g., the first or third state), the voltage across the inductor 125 is equal to the difference between the voltage pulse provided by the rectifier bridge 62 and the voltage across the capacitor 135 (when fully charged). When the rectifier bridge 62 produces no current pulse (e.g., the second state), the voltage across the inductor 125 is equal to the voltage across the capacitor 135, but with an opposite polarity. Thus, the current flow present in the inductor 125 increases during the first and third states, and decreases during the second state. The secondary side 10 is further configured such that each time the rectifier bridge 63 causes a voltage pulse across the diode 110 (e.g., the first or third state), the voltage across the inductor 130 is equal to the difference between the voltage pulse provided by the rectifier bridge 63 and the voltage across the capacitor 140 (when fully charged). When the rectifier bridge 63 produces no current pulse (e.g., the second state), the voltage across the inductor 130 is equal to the voltage across the inductor 130 during the first and third states, but with an opposite polarity. When averaged over a full switching cycle (e.g., the switch transistors 20, 23, 30, and 35 progress through each of the first, second, third, and second states), the current in the inductors 125 and 130 preferably settles at an average DC current that equals the load current being drawn from each of the Vout+ output 145 and the Vout− output 150, respectively. The amount of ripple current present in each of the inductors 125 and 130 can be defined as:

$$\Delta i = \frac{(V \times \Delta t)}{L}$$

where Δi is the peak-to-peak ripple current, V is the voltage of the voltage pulses across the inductors 130 and 135 during the states when a voltage pulse is provided by the rectifier bridges 62 and 63, Δt is the duration of the voltage pulses provided by the rectifier bridges 62 and 63, and L is the inductance of the inductors 125 and 130.

The capacitor 135 is coupled between the Vout+ output 145 and the Vout0V output 150. The capacitor 140 is coupled between the Vout− output 155 and the Vout0V output 150. The capacitor 135 is configured to work in conjunction with the inductor 125 as a low-pass filter such that the voltage pulses across the diode 105 are filtered into clean DC voltage. The capacitor 140 is configured to work in conjunction with the inductor 130 as a low-pass filter such that the voltage pulses across the diode 110 are filtered into clean DC voltage. Preferably, the cut-off frequency of the low-pass filters (i.e., the combination of the inductors 125 and 130, and the capacitors 135 and 140, respectively) is about 1-10% of a PWM frequency of the primary side 5 (e.g., the frequency at which the switch transistors 20, 25, 30, and 35 progress through all three states). For example, if the PWM frequency is 50 kHz (i.e., the time between the start of consecutive first states every 20 μS) the preferred frequency of each of the low-pass filters would be 500-5,000 Hz. Furthermore, increasing the capacity of the capacitors 135 and 140 (relative to the preferred size corresponding to the preferred frequency cut-off of the low-pass filters) can further stabilize the output of the converter 1.

Figure 3:
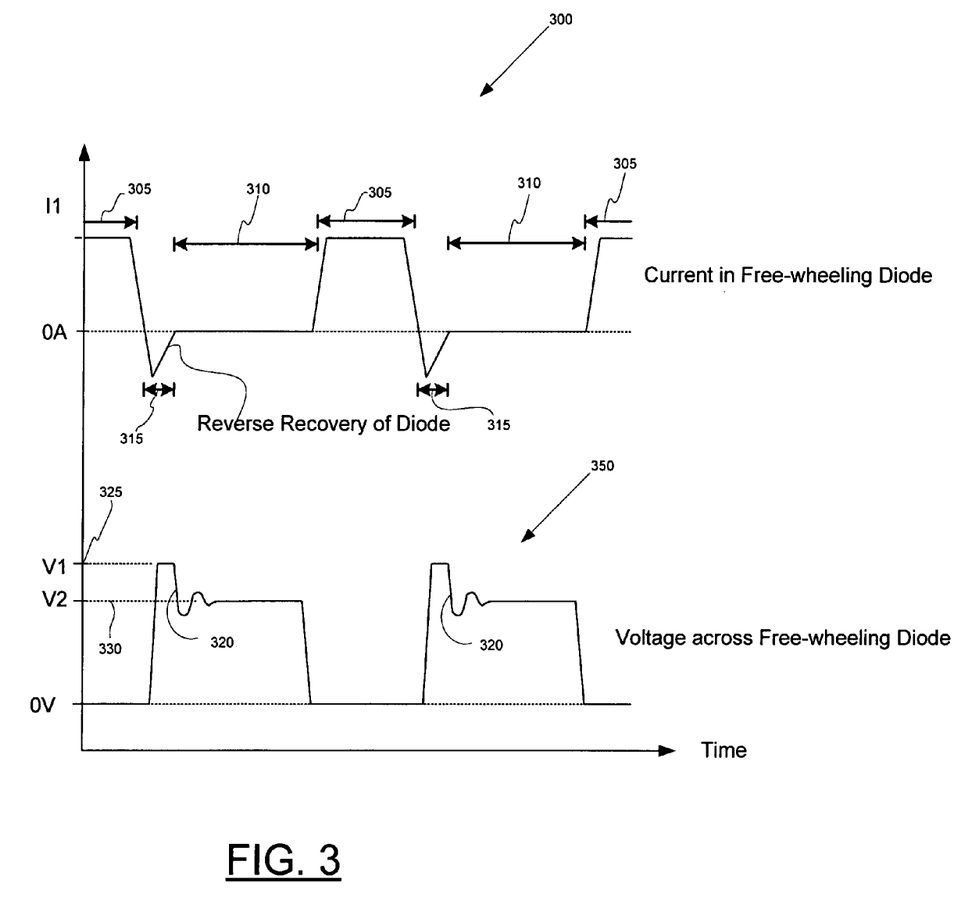
FIG. 3 is a graph representing a voltage and a current across a freewheeling diode in the DC/DC voltage converter of FIG. 1.

Referring also to FIG. 3, a graph 300 represents a current flow through the diode 105 and a graph 350 represents a voltage across the diode 105 when the DC/DC voltage converter 1 is in operation. The current and voltage across the diode 110 are similar to the graphs 300, 350. No current is conducted through the diode 105 during intervals 310, which correspond to times when there is a non-zero voltage across the secondary winding 170. A non-zero voltage across the secondary winding 170 occurs when the switch transistors 20, 25, 30, and 35 are in the first state or the third state. The diode 105 conducts current, or "freewheels" during intervals 305, which correspond to times when there is zero voltage across the secondary winding 170. This occurs when the switch transistors 20, 25, 30, and 35 are in the second state.

A negative current is conducted through the diode 105 during an interval 315 during the "reverse recovery period" of the diode 105. For example, when a forward-biasing voltage applied across the diode 105 is changed to a negative-biasing voltage, the diode 105 conducts current for a short period of time (here, corresponding to the interval 315) from the cathode to the anode. The reverse current produced by the diode 105 causes a voltage spike 320. The diode 120 becomes active and conducts current when the voltage across the diode 105 reaches a voltage level 325 thereby inhibiting the voltage across the diode 105 from rising higher. The voltage level 325 is equal to the sum of the voltages across the capacitors 135 and 140. Likewise, the diode 115 becomes active and conducts current when the voltage across the diode 110 reaches a voltage level 325, thereby inhibiting the voltage across the diode 110 from rising higher. Once the current in the secondary transformer windings 170 is equal to or less than the current in the inductors 125, the diode 105 becomes inactive and stops conducting current. With the diode 105 inactive, the voltage across the diodes 105 drops, stabilizing at a voltage level 330. The voltage 330 is substantially equal to the voltage provided across the V+ input terminal 40 and the V− input terminal 45 multiplied by the turns ratio of the transformer 160.

Using the PWM controller 48, the DC/DC voltage converter 1 can regulate varying input voltages to a single, controlled output voltage. For example, if the DC/DC voltage converter 1 uses a transformer 160 with a 7:1 secondary: primary turn ratio (i.e., is a step-up transformer), an input voltage range of 30V to 60V may be regulated to a stable output voltage of about 210V by varying the duty cycle of the quasi-square wave provided to the primary winding 165 of the transformer 160. As the input voltage rises from a low-end input voltage for a given output voltage, the duty cycle of the quasi-square wave provided to the primary winding 165 of the transformer 160 is reduced to maintain a constant output voltage. The ratio of the high-end input voltage to the low-end input voltage is 2:1, although operation outside of this range is possible. For example, if 100V is the desired output of a DC/DC converter using a 4:1 step-up transformer, the input voltage may range from approximately 25V to 50V. As the voltage increases from approximately 25V to approximately 50V, the duty cycle of the quasi-square wave provided to the transformer 160 is reduced. The ratio of the high-end input voltage to the low-end input voltage can change when non-ideal components are used. For example, a ratio of 1.6:1 is possible.

To control undesirable voltage rise in an unloaded output of the DC/DC voltage converter 1 (e.g., when one of the Vout+ output 145 or the Vout− output 155 is unloaded, e.g., due to an extreme situation or operating fault), the primary side 5 is regulated by the higher of the two output voltages, or is regulated down (or shut down) if either of the outputs 145, 155 reaches an abnormally high voltage. The PWM controller 48 uses the higher output voltage to set the duty cycle of the quasi-square wave provided by the switch transistors 20, 25, 30, and 35, to help avoid unbalanced operation.

Figure 4:
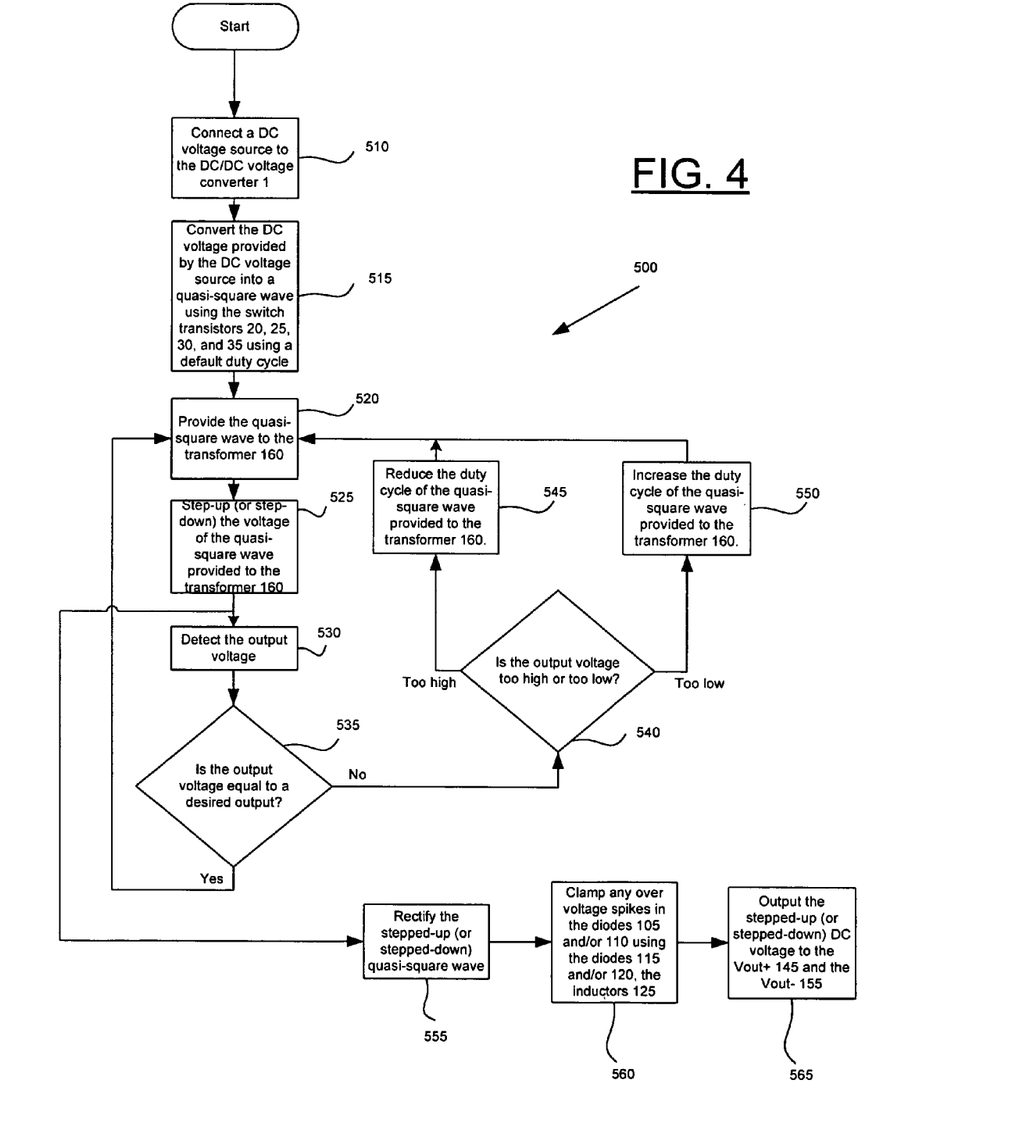
FIG. 4 is a flowchart of a process of maintaining a substantially constant output voltage in the circuit shown in FIG. 1.

In operation, referring to FIG. 4, with further reference to FIGS. 1 and 3, a process 500 for maintaining a constant output voltage at the Vout+ output 145 and the Vout-output 155, using the DC/DC voltage converter 1, includes the stages shown. The process 500, however, is exemplary only and not limiting. The process 500 may be altered, e.g., by having stages added, removed, or rearranged.

At stage 510, the input power source 50 is coupled across the V+ input terminal 40 and the V− input terminal 45. The input power source 50 provides a DC voltage to the DC/DC voltage converter 1.

At stage 515, the PWM controller 48 toggles the switch transistors 20, 25, 30, and 35 to effect each of the three states (i.e., the first, second, and third states) in the desired order to generate a quasi-square wave. The duty cycle of the quasi-square wave is initially set to a default setting, such as 50%. At stage 520, the quasi-square wave is provided to the primary winding 165 of the transformer 160.

At stage 525, the transformer 160 steps up (or steps down) the voltage of the quasi-square wave as a function of the turn ratio between the primary winding 165 and the secondary windings 170 and 175, as described above.

At stage 530, the voltage supplied at the outputs of the DC/DC voltage converter 1 (e.g., at the Vout+ output 145 and the Vout− output 155) is monitored by the PWM controller 48. In stage 535, the PWM controller 48 determines if the voltage is equal to a desired voltage level. Various time intervals between voltage readings may be used. Using smaller time intervals between voltage readings may produce a more constant output at the Vout+ 145 and/or the Vout− 155. If the voltage supplied by the DC/DC voltage converter I equal to the desired level, the duty cycle of the quasi-square wave being provided to the primary winding 165 of the transformer 160 is not adjusted and the process 500 returns to the stage 520. Otherwise, the process 500 proceeds to stage 540.

At stage 540, with the voltage supplied by the DC/DC voltage converter 1 not being equal to a desired voltage level, the PWM controller 48 determines if the voltage supplied by the DC/DC voltage converter 1 is too high or too low. If the voltage supplied by the DC/DC voltage converter 1 is too high, the process 500 proceeds to stage 545. If the voltage supplied by the DC/DC voltage converter 1 is too low, the process 500 proceeds to stage 550.

At stage 545, with the voltage supplied by the DC/DC voltage converter 1 too high, the duty cycle of the quasi-square wave is reduced (e.g., from 50% to 25%) proportional to an amount over the desired voltage level to help the supplied voltage remain or return to the desired value/range. At stage 550, with the voltage supplied by the DC/DC voltage converter 1 too low, the duty cycle of the quasi-square wave is increased (e.g., from 25% to 50%) to help the supplied voltage remain or return to the desired value/range. The duty cycle of the quasi-square wave is adjusted by lengthening or shortening the amount of time that the switch transistors 20, 25, 30, and 35 are in the first (or third) state compared to the summed duration of the first state and a single instance of the second state. Preferably, the total cycle time of all four states is kept constant, although the total cycle time can vary.

At stage 555, the stepped-up (or stepped-down) quasi-square wave is rectified by the rectifier bridges 62 and 63, thus creating voltage pulses that correspond to the quasi-square wave provided to the transformer 160.

At stage 560, excess energy spikes that occur across the diodes 105 and 110 when there is non-zero voltage across the secondary winding 170 or 175 are clamped by the diodes 120 and 115, respectively. When the voltage across the diode 105 rises above the sum of the voltages across the capacitors 135 and 140, the diode 120 conducts the excess energy across the diode 105 to the Vout− output 155. When the voltage across the diode 110 rises above the sum of the voltages across the capacitors 135 and 140, the diode 115 conducts the excess energy across the diode 110 to the Vout+ output 145. When the current in the secondary winding 170 has dropped to a level that is about equal to the current in the inductor 125, the diode 115 becomes inactive and stops conducting current. When the current through the inductor 130 is greater than the current in the secondary winding 175, the diode 120 becomes inactive. When the diodes 115 and 120 are inactive, the voltages across the diodes 105 and 110, respectively, become stable at a voltage equal to the converter input voltage multiplied by the transformer turns ratio. At stage 565, the rectified DC power is output to the Vout+ output 145 and/or the Vout− output 155.

Figure 5:
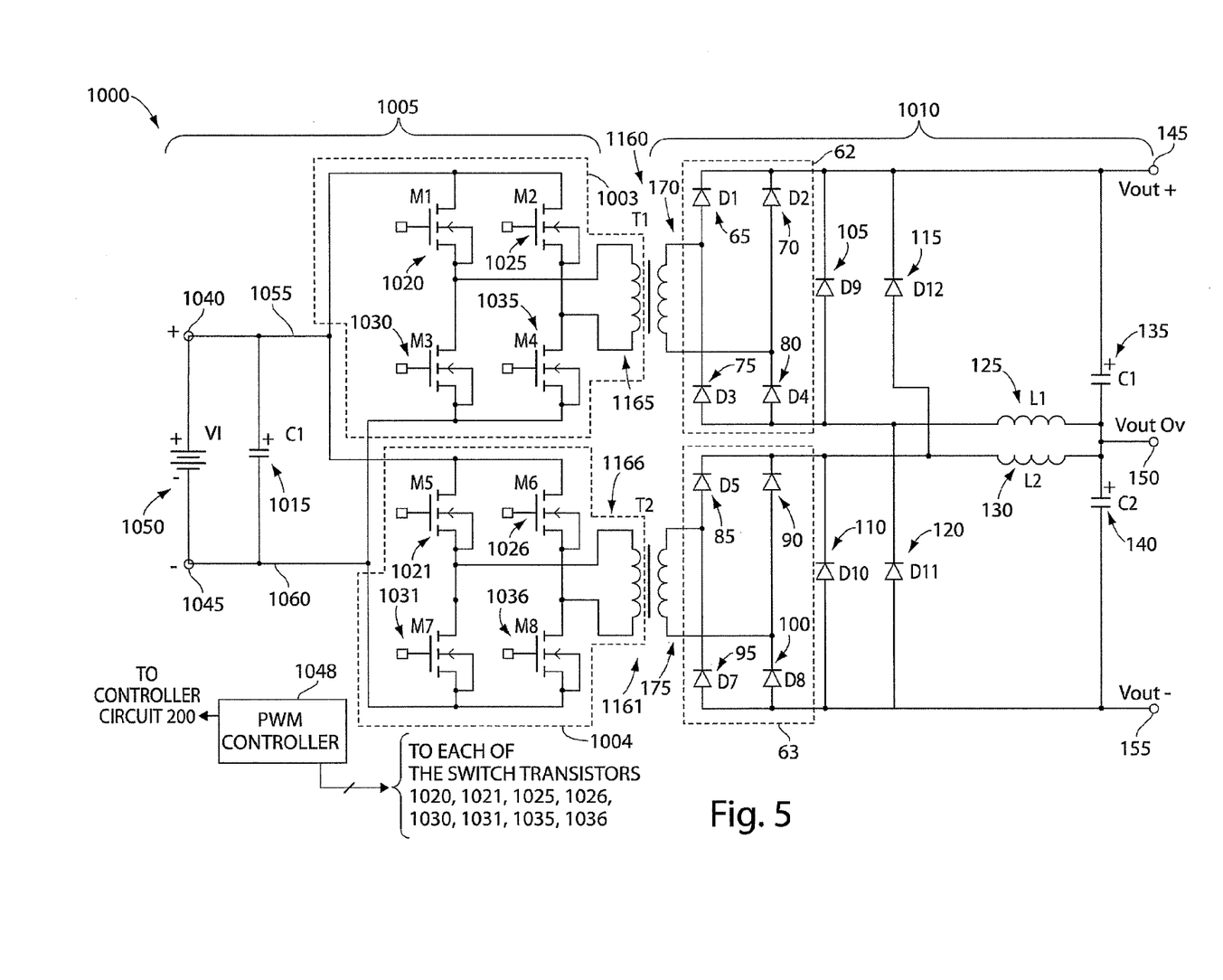
FIG. 5 is a circuit diagram of a dual DC/DC voltage converter with an over voltage clamp.

FIG. 5 shows a DC/DC converter 1000 having a primary side 1005, transformers 1160 and 1161, and the secondary side 10 as shown and described with respect to FIG. 1.

The primary side 1005 includes a capacitor 1015, converters 1003 and 1004, transformers 1160 and 1161, a V+ input terminal 1040, a V− input terminal 1045, a positive voltage rail 1055, a negative voltage rail 1060, and the PWM controller 1048. The transformer 1160 includes a primary winding 1165 and the secondary winding 170. The transformer 1161 includes a primary winding 1166 and the secondary winding 175. The V+ input terminal 1040 and the V− input terminal 1045 are connected across an input power source 1050 and connected to the positive voltage rail 1055 and the negative voltage rail 1060. A capacitor 1015 is connected between the positive voltage rail 1055 and the negative voltage rail 1060. Switch transistors 1020, 1025, 1030, and 1035 are connected between the positive voltage rail 1055 and the negative voltage rail 1060 in an H-bridge configuration. The primary winding 1165 of the transformer 1160 is coupled across the H-bridge between the junction of the switch transistors 1020 and 1030 and the switch transistors 1025 and 1035. The switch transistors 1021, 1026, 1031, and 1036 are connected between the positive voltage rail 1055 and the negative voltage rail 1060 in an H-bridge configuration. The primary winding of the transformer 1161 is coupled across the H-bridge between the junction of the switch transistors 1021 and 1031 and the switch transistors 1026 and 1036. Each of the switch transistors 1020, 1021, 1025, 1026, 1030, 1031, 1035 and 1036 are configured such that its bulk terminal is connected to its source terminal. The capacitor 1015 is typically about 40,000 µF, although other capacitances and/or configurations are possible (e.g., four 10,000 µF capacitors in parallel).

The PWM controller 1048 is coupled to the gate of each of the switch transistors 1020, 1021, 1025, 1026, 1030, 1031, 1035, and 1036. The PWM controller 1048 actuates and deactuates pairs of the switch transistors 1020,1021, 1025, 1026, 1030, 1031, 1035, and 1036 to regulate current flow to produce a pulse-width modulated quasi-square wave at the primary windings 1165 and 1166 of the transformers 1160 and 1161, respectively. For example, in the first state the switch transistors 1020, 1035, are actuated and the switch transistors 1025 and 1030 are deactuated, thereby providing a positive voltage to the primary winding 1165 of the transformer 1160. Also, in the first state, the switch transistors 1021, 1036, are actuated and the switch transistors 1026 and 1031 are deactuated, thereby providing a positive voltage to the primary winding 1166 of the transformer 1161. In the second state, all of the switch transistors 1020, 1021, 1025, 1026, 1030, 1031, 1035, and 1036 are deactuated thereby providing substantially no voltage across the primary windings 1165 and 1166. In the third state, the switch transistors 1030, 1025, are actuated and the switch transistors 1020 and 1035 are deactuated, thereby providing a negative voltage to the primary winding 1165 of the transformer 1160. In the third state, the switch transistors 1031, 1026, are actuated and the switch transistors 1021 and 1036 are deactuated, thereby providing a negative voltage to the primary winding 1166 of the transformer 1161. The PWM control 1048 is configured to monitor the output voltages at the Vout+ output 145 and the Vout− output 155, and to adjust the duty cycles to maintain the output voltages at desired levels.

The primary side 1005 is connected to the secondary side 1010 via the transformers 1160 and 1161. The transformers 1160 and 1161 are high-frequency transformers including a ferrite core, although other transformers may be used. In operation, the ratio of turns between the primary windings 1165 and 1166, and the secondary windings 170 and 175, respectively, are configured in the same manner as discussed above with respect to the transformer 160.

The DC/DC voltage converter 1000 may be used to reduce the input ripple current and/or provide individual regulation of each of the voltage outputs 145, 155. Each of the converters 1003 and 1004 draws two current pulses from the input source for each switching cycle. The switching pattern of each of the converters 1003 and 1004 is offset by 90 degrees of a switching cycle, which helps reduce the amplitude of the ripple current. Voltage from the converter 1003 is supplied externally from the voltage output 145, 150, and voltage from the converter 1004 is supplied externally from the Vout+ output 155 and the Vout0V output 150). During uneven loading of the voltage outputs (e.g., only the Vout+ output 145 and the Vout0V output 150 are connected), symmetrical output voltage is maintained using a controller circuit 200 (shown in FIG. 6).

Figure 6:
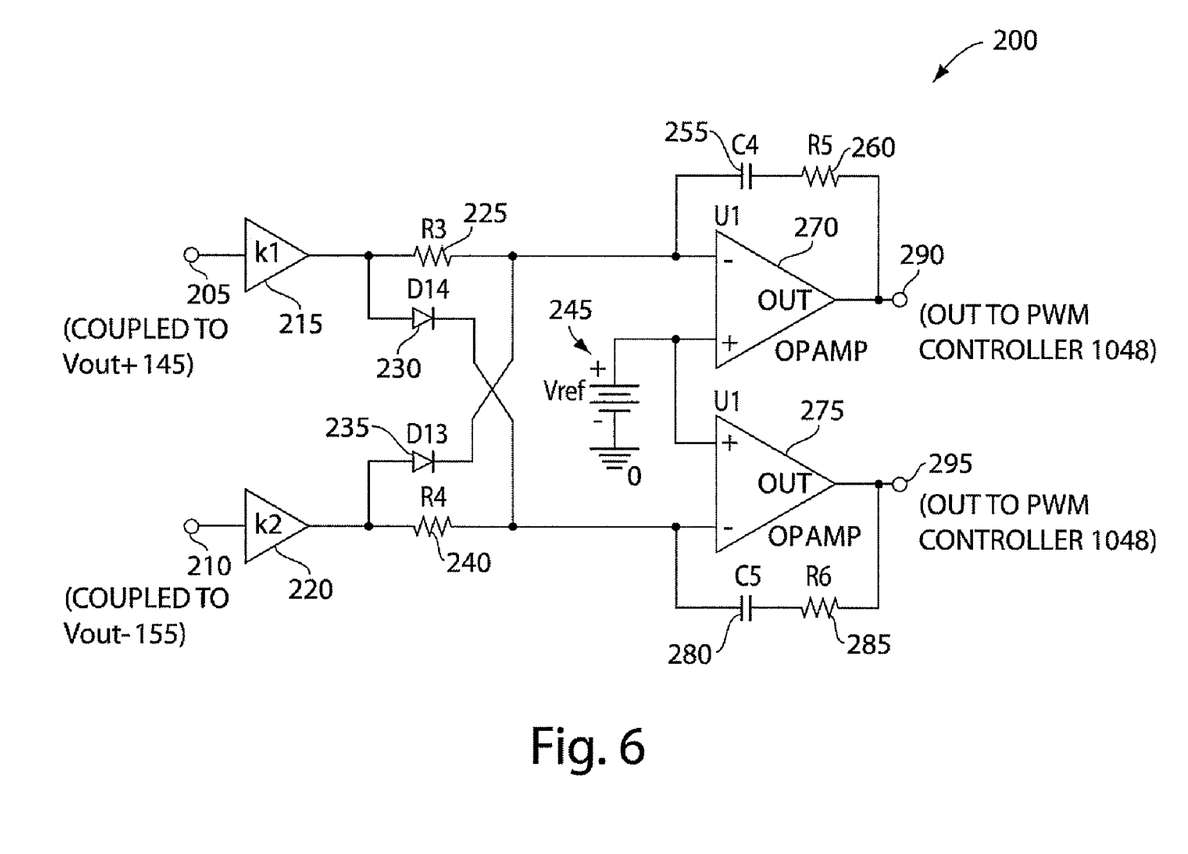
FIG. 6 is a circuit diagram of a DC/DC voltage converter controller circuit.

Referring to FIG. 6, the controller circuit 200 is configured to guard against uncontrolled voltage rise in the DC/DC voltage converter 1000 includes amplifier 215, inverting amplifier 220, resistors 225, 240, 260, 285, diodes 230, 235, operational amplifiers ("op amps") 270, 275, capacitors 255, 280, resistors 260, 285, outputs 290, 295, and input terminals 205, 210. The amplifier 215 and the resistor 225 are connected in series between the input terminal 205 and the negative input of the op amp 270. The inverting amplifier 220 and the resistor 240 are connected in series between the input terminal 210 and the negative input of the op amp 275. The output of the amplifier 215 is connected to the negative terminal of the op amp 275 through the diode 230. The anode of the diode 230 is connected to the output of the amplifier 215. The output of the inverting amplifier 220 is connected to the negative terminal of the op amp 270 through the diode 235. The anode of the diode 235 is connected to the output of the inverting amplifier 220. The positive input of the op amps 270 and 275 are connected to a positive terminal of a reference voltage Vref 245. A negative terminal of the reference voltage Vref 245 is grounded. The capacitor 255 and the resistor 260 are connected in series between the negative input of the op amp 270 and the output of the op amp 270, thus creating a first integrator circuit. The capacitor 280 and the resistor 285 are connected in series between the negative input of the op amp 275 and the output of the op amp 270, thus creating a second integrator circuit. The diodes 230 and 235 are preferably 1N4148, but other diodes may be used. The resistors 225, 240, 260, and 285 are preferably about 10 kOhms, but other impedances are possible. The op amps 270 and 275 are preferably TL084, but other models can be used. The Vref 245 is preferably 5V to 10V, although other voltages can be used.

The controller circuit 200 is typically idle when the voltages provided by the Vout+ 145 and the Vout- 155 are equal. For example, when the DC/DC voltage converter 1000 is connected to the controller circuit 200, and the DC/DC voltage converter 1000 is operating normally (i.e., substantially balanced outputs), the diodes 230 and 235 are unpowered. As a voltage differential between the Vout+ output 145 and the Vout- output 155 increases, the voltage differential will eventually become one diode drop higher than the reference voltage Vref 245. Once the input voltage differential between the input terminal 205 and the input terminal 210 is higher than one diode drop (e.g., about 0.5V) of the diodes 230 or 235, that diode, 230 or 235, begins to conduct current. Once the diode 230 or 235 begins conducting current, the appropriate converter 1003, 1004 is regulated down by the PWM controller 1048 by adjusting a pulse width modulation signal provided to the switch transistors 1020, 1021, 1025, 1026, 1030, 1031, 1035, and 1036. By choosing a specific ratio between the reference voltage Vref 245 and the diode drop voltage (e.g., 5 to 10V), the voltage rise of the Vout+ output 145 and/or the Vout- output 155 can be limited to between about 5-10% above a desired output voltage.

To control the duty-cycle of the quasi-square wave provided to the transformers 1160 and 1161, a voltage comparator (not shown) can be used. For example, the DC signal provided by the controller 200 can be fed to the non-inverting input of a voltage comparator (e.g., a LM339) along with a triangular or saw-tooth shaped signal. The frequency of the saw-tooth signal is equal to the desired PWM frequency. Thus, the comparator can generate PWM pulses at its output. The dependency of duty cycle versus DC (control) signal can be determined by the peak-to-peak amplitude of the triangular or saw-tooth signal.

The controller circuit 200 is configured to be coupled to the DC/DC voltage converter 1000. The input terminal 205 is coupled to the Vout+ output 145 and the input terminal 210 is coupled to the Vout-155. The outputs 290 and 295 are coupled to the PWM controller 1048. As the voltage at each of the outputs 290 and 295 varies, the duty cycle of the quasi-square waves provided to the transformers 1160 and 1161 is adjusted based on the output voltages at the outputs 145, 155.

Figure 7:
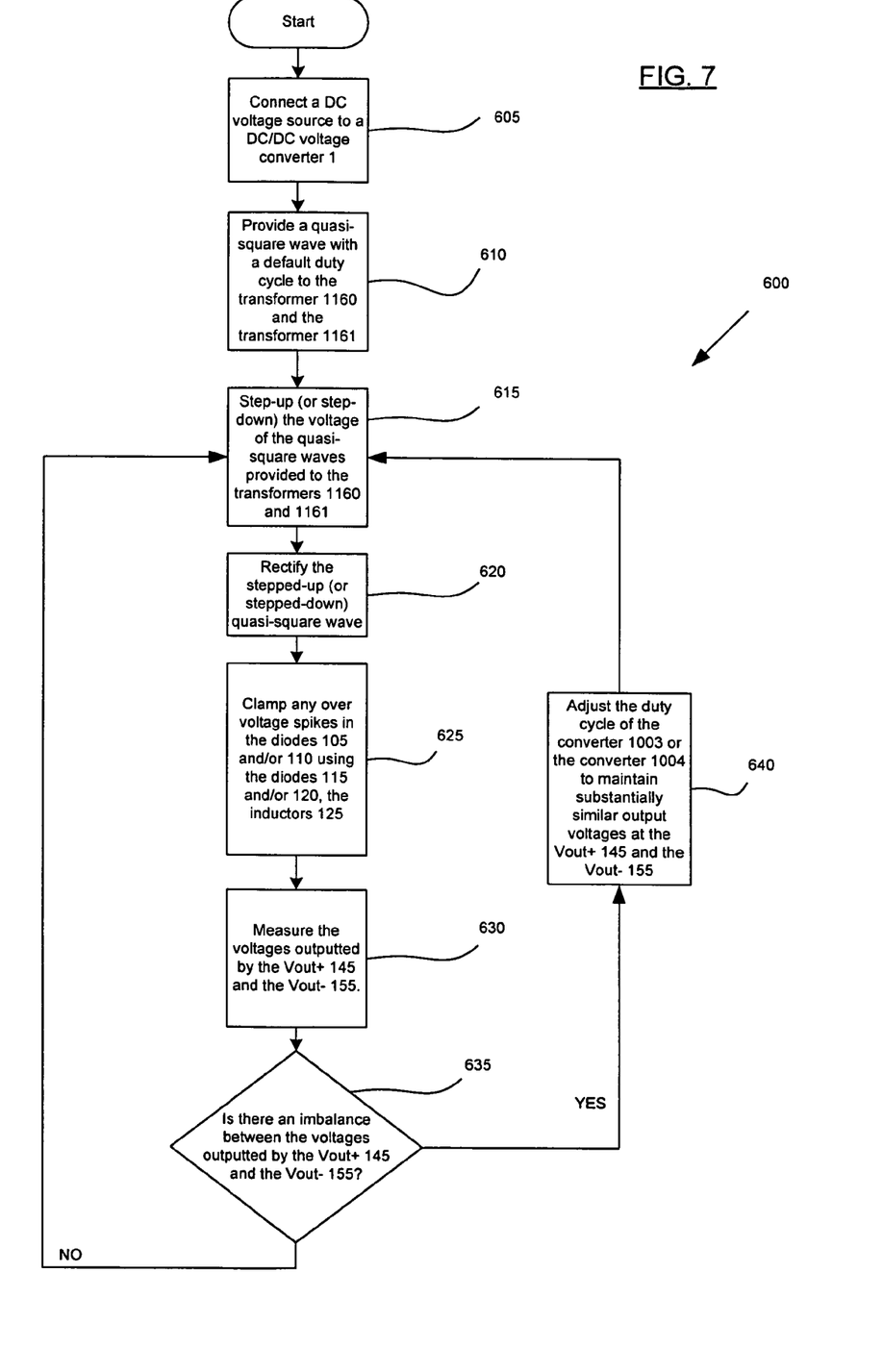
FIG. 7 is a flowchart of a process of maintaining a substantially balanced output voltage in the circuit shown in FIG. 4.

In operation, referring to FIG. 7, with further reference to FIGS. 5 and 6, a process 600 for maintaining a balanced output voltage at the Vout+ output 145 and the Vout-output 155, using the DC/DC voltage converter 1000, includes the stages shown. The process 600, however, is exemplary only and not limiting. The process 600 may be altered, e.g., by having stages added, removed, or rearranged.

At stage 605 the input power source 1050 is coupled across the V+ input terminal 1040 and the V- input terminal 1045. The input power source 50 provides a DC voltage to the DC/DC voltage converter 1000.

At stage 610 the PWM controller 1048 toggles the switch transistors 1020, 1021, 1025, 1026, 1030, 1031, 1035, and 1036 through each of the three states, (i.e., the first, second, and third states) thereby generating quasi-square waves. The quasi-square wave generated by the switch transistors 1020, 1025, 1030, and 1035 is provided to the primary winding 1165 of the transformer 1160. The quasi-square wave generated by the switch transistors 1021, 1026, 1031, and 1036 is provided to the primary winding 1166 of the transformer 1161. The duty cycles of the quasi-square waves are initially set to a default setting, such as 50%.

At stage 615, the transformers 1160 and 1161 step up (or step down) the voltage of the quasi-square wave as a function of the turns ratio between the primary winding 165 and the secondary windings 170 and 175, as described above.

At stage 620, the stepped-up (or stepped-down) quasi-square waves provided by the transformers 1165 and 1166 are rectified by the rectifier bridges 62 and 63, respectively. At stage 625, over-voltage spikes in the diodes 105 and/or 112 are clamped using the diodes 115 and/or 120, the inductors 125 and/or 130, and the capacitors 135 and/or 140 as described above with respect to FIG. 3.

At stage 630, the voltages at the Vout+ node 145 and the Vout- node 155 are measured by the controller circuit 200. At stage 635, the controller circuit 200 compares the output of the Vout+ node 145 to the Vout- node 155 and determines if there is a difference of at least one diode drop (of the diodes 230 and/or 235). If the voltages at the Vout+ node 145 and the Vout- node 155 are equal, no changes are made to the duty cycle of the quasi-square waves provided to the converters 1003 and 1004, and the process 600 proceeds to stage 615, and otherwise proceeds to the stage 640.

At stage 640, if the voltage at either the Vout+ node 145 or the Vout- node 155 is one diode drop (of the diodes 230 or 235) higher than at the other node 145, 155, the duty cycle of the quasi-square wave provided to the appropriate transformer 1160, 1161 is modified by the controller 200 via the PWM controller 1048. If the voltage at the Vout+ node 145 is one diode drop (of the diode 230) higher than the voltage at the Vout- node 155, the duty cycle of the quasi-square wave being provided to the converter 1003 is reduced. If the voltage at the Vout- node 155 is one diode drop (of the diode 235) higher than the voltage at the Vout+ node 145, the duty cycle of the quasi-square wave provided to the converter 1004 is reduced. The duty cycle can be changed using a comparator that receives the output of the controller 200 and a saw-tooth wave as described above. Thus, the voltage supplied by the Vout+ 145 and the Vout– 155 can remain balanced.

Other embodiments are within the scope and spirit of the invention. For example, due to the nature of signal processing, functions described above can be implemented using software, hardware, firmware, hardwiring, or combinations of any of these. Features implementing functions may also be physically located at various positions, including being distributed such that portions of functions are implemented at different physical locations.

While specific components and configurations have been shown in the figures, and described herein, other configurations are possible. For example, the capacitor 15 (shown in FIG. 1) may consist of several capacitors to achieve a specific capacitance. While the items described as being connected have been shown directly connected, other configurations are possible. For example connected items may be indirectly connected, e.g., through another component (e.g., the capacitor 15 may be connected across the source 50, with a resistor in series with the capacitor 15). Also, the term "diode" is not limited to low-voltage "logic devices," rather, high-power/high-voltage (e.g., 1000V) devices may also be used.

While certain waveforms have been described herein (e.g., quasi-square wave, square wave pulses, DC, etc), these terms include non-ideal signals. For example, the square wave pulses shown in FIG. 3 are not perfectly square. As another example, "DC power" may not be perfectly constant, yet still be considered "DC power" (e.g., there may be ripple current in a DC signal). Furthermore, while certain relationships have been described herein (e.g., equal, inverse, the relationships include imperfect relationships (e.g., nearly equal, nearly inverse), e.g., due to the use of non-ideal components.

Further, while the description above refers to the invention, the description may include more than one invention.

What is claimed is:

1. A system for receiving DC power of a first level and providing DC power of a second level, the system including first, second, and third outputs, the system comprising:
    a transformer;
    a primary module configured to receive DC power of a first level and to provide a quasi-square wave to the transformer;
    a first rectifier bridge coupled to the transformer, and including first and second nodes, the first node being coupled to the first output;
    a second rectifier bridge coupled to the transformer, and including third and fourth nodes, the fourth node being coupled to the third output; and
    a voltage clamp arrangement coupled to the first and second rectifier bridges, the clamp arrangement comprising:
    a first diode coupled between the first node and the third node; and
    a second diode coupled between the second node and the fourth node; wherein the first diode is configured to direct energy from the first rectifier bridge to the third output if the voltage across the first rectifier bridge exceeds a first threshold; wherein the second diode is configured to direct energy from the second rectifier bridge to the first output if the voltage across the second rectifier bridge exceeds a second threshold.

2. The system of claim 1 further comprising: a first inductor coupled between the second node and the second output; and a second inductor coupled between the third node and the second output.

3. The system of claim 1 further comprising: a first capacitor coupled between the first output and the second output; and a second capacitor coupled between the second output and the third output.

4. The system of claim 1 wherein the first diode includes an anode and a cathode, and the second diode includes an anode and a cathode, wherein the anode of the first diode is coupled to the third node, the cathode of the first diode is coupled to the first output, the anode of the second diode is coupled to the fourth node, and the cathode of the second diode is coupled to the second node.

5. The system of claim 1 further comprising: a third diode coupled between the first and second nodes; and a fourth diode coupled between the third and fourth nodes.

6. A DC/DC converter comprising:
    an input;
    a first output node;
    a second output node;
    a third output node;
    a DC to AC converter coupled to the input;
    a transformer coupled to the DC to AC converter and having a primary side and a secondary side;
    a first rectifier circuit coupled to the secondary side, the first rectifier circuit having a first rectifier output and a second rectifier output with the first rectifier output coupled to the first output node, the first rectifier circuit having at least two rectifier diodes;
    a second rectifier circuit coupled to the secondary side, the second rectifier circuit having a third rectifier output and a fourth rectifier output with the fourth rectifier output coupled to the third output node, the second rectifier circuit having at least two rectifier diodes that are distinct from the at least two rectifier diodes of the first rectifier circuit;
    a first diode coupled between the first output node and the third rectifier output;
    a second diode coupled between the third output node and the second rectifier output, wherein the first diode and the second diode are distinct from the rectifier diodes of the first rectifier circuit and the second rectifier circuit;
    a first inductor coupled between the second output node and the second rectifier output; and
    a second inductor coupled between the third rectifier output and the second output node.

7. The DC/DC converter of claim 6, wherein the DC/DC converter is configured to provide a first output voltage between the first output node and the second output node and a second output voltage between the second output node and the third output node with the first output voltage being substantially equal to the second output voltage.

8. The DC/DC converter of claim 7, further comprising a first capacitor coupled between the first output node and the second output node, and a second capacitor coupled between the second output node and the third output node.

9. The DC/DC converter of claim 8, further comprising a third diode coupled between the first output node and the second rectifier output, and a fourth diode coupled between the third output node and the third rectifier output.

* * * * *

UNITED STATES PATENT AND TRADEMARK OFFICE
CERTIFICATE OF CORRECTION

PATENT NO. : 7,583,521 B2  Page 1 of 1
APPLICATION NO. : 11/361638
DATED : September 1, 2009
INVENTOR(S) : Nielsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 124 days.

Signed and Sealed this

Fourteenth Day of September, 2010

David J. Kappos
*Director of the United States Patent and Trademark Office*